3,066,138
2,3-ACETONIDE DERIVATIVES OF ANDROSTANES
John Edwards, Mexico City, Mexico, assignor, by mesne assignments, to Syntex Corporation, a corporation of Panama
No Drawing. Filed Nov. 17, 1961, Ser. No. 153,242
22 Claims. (Cl. 260—239.55)

The present invention relates to novel cyclopentanophenathrene derivatives and to a process for the production thereof.

More particularly the present invention relates to ketonides of derivatives of androstane-2α,3α-diol and androstane-2β,3β-diol.

The novel compounds of the present invention which are anabolic-androgenic agents with a particularly favorable anabolic-androgenic ratio and which exhibit anti-estrogenic and anti-gonadotrophic activities, relieve premenstrual tension, suppress the action of the pituitary gland and possess useful blood cholesterol lowering and anti-fibrillatory properties, are represented by the following formulas:

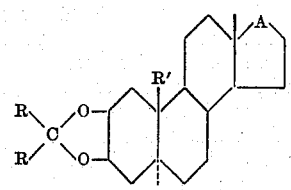

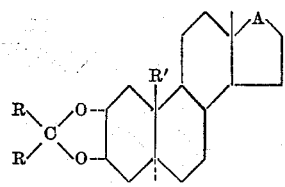

In the above formulas, R represents a lower alkyl group, $R^1$ represents hydrogen or methyl; A represents

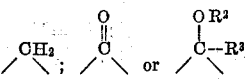

wherein $R^2$ represents hydrogen or a hydrocarbon carboxylic acyl group containing less than 12 carbon atoms, and $R^3$ represents hydrogen or an alkyl, alkenyl or alkynyl group of less than 6 carbon atoms.

The acyl group is derived from hydrocarbon carboxylic acids containing less than 12 carbon atoms which may be saturated or unsaturated, of straight, branched, cyclic or cyclic aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process illustrated by the following equation:

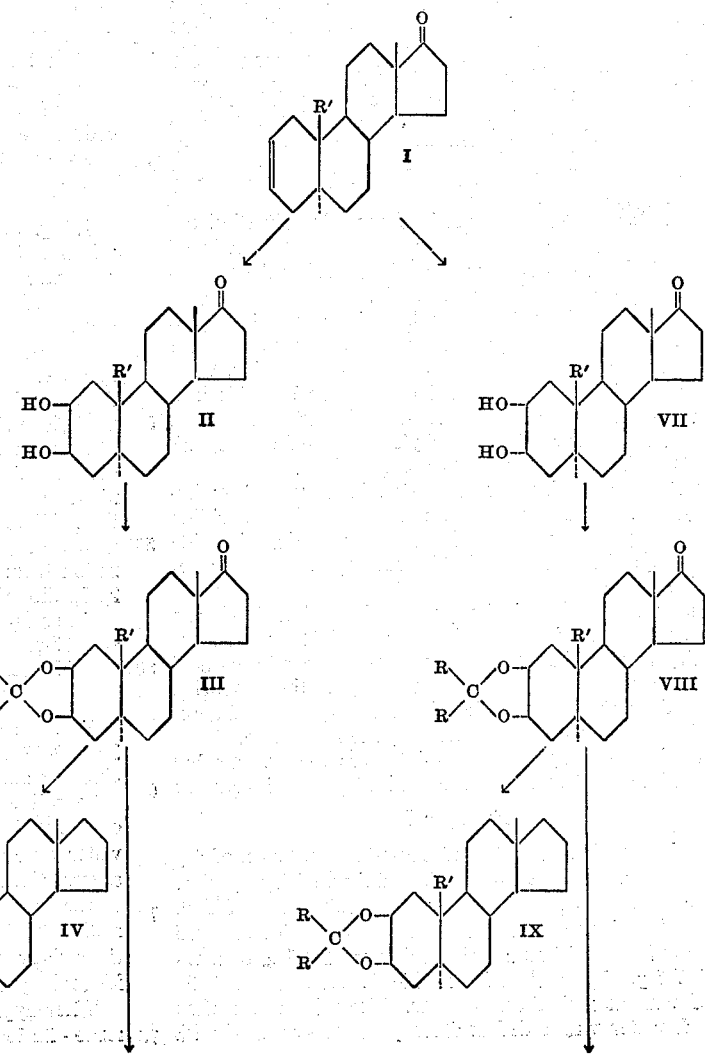

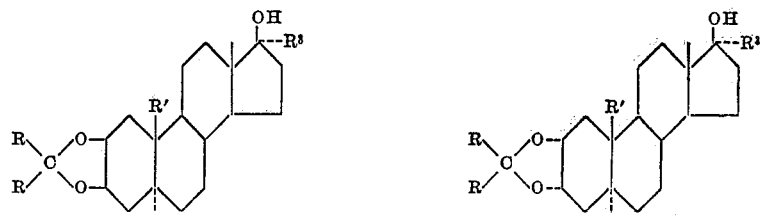

V: $R^3$=H  
VI: $R^3$=hydrocarbon

X: $R^3$=H  
XI: $R^3$=hydrocarbon

In the above formulas R, $R^1$ and $R^3$ have the same meaning as previously set forth.

In practicing the process outlined above, the starting compound which is $\Delta^2$-androsten-17-one or the 19-nor derivative thereof (I) is treated with iodine and a silver salt of an organic acid such as acetic acid in a suitable solvent preferably acetic acid, thus affording the corresponding androstane-2β,3β-diol derivative (II).

Following a second procedure, the starting compound (I) is treated with osmium tetroxide in the persence of pyridine and in a suitable solvent such as benzene at approximately 20° C. for a period of time of the order of 90 hours, furnishing the corresponding androstane-2α,3α-diol derivative (VII). Treatment of the androstane-2,3-diol-17-one compound (II, VII) with a ketone such as acetone, ethyl methyl ketone, diethyl ketone, ethyl amyl ketone and the like, in the presence of a mild acid such as perchloric acid, leads to the condensation of the carbonyl group with the glycol group thus affording the corresponding dialkylmethylenedioxy derivative (III, VIII). Treatment of this latter compound with hydrazine hydrate and subsequent heating of the formed hydrazone to about 200° C., preferably by reflux in a solvent such as diethylene glycol, yields the corresponding 17-desoxo derivative (IV, IX).

Following a second procedure the dialkylmethylenedioxyandrostan-17-one compound (III, VIII) is reduced preferably with sodium borohydride affording the respective 17β-hydroxy derivative (V, X).

A third reaction of the androstan-17-one derivative (III, VIII) with an alkyl, alkenyl or alkynyl magnesium halide, as for example, methyl magnesium bromide, vinyl magnesium bromide or ethynyl magnesium bromide in a solvent inert to the reagent such as benzene, furnishes the corresponding dialkylmethylenedioxy-17α-alkyl, alkenyl or alkynyl-androstan-17β-ol (VI, XI).

The above obtained compounds with a secondary hydroxyl (V, X) are conventionally acylated in pyridine with an acylating agent, as for example acetic anhydride or benzoyl chloride to yield the corresponding ester derivative.

The compounds of the present invention having a tertiary hydroxyl in the molecule (VI, XI) are conventionally acylated in the presence of p-toluenesulfonic acid with an excess of an acylating agent such as the anhydride of a hydrocarbon carboxylic acid of the type defined hereinbefore, thus furnishing the corresponding acylate.

The following specific examples serve to illustrate but are not intended to limit the scope of the present invention:

Example I

A mixture of 13 g. of $\Delta^2$-androsten-17-one, 50 cc. of dry benzene, 1 g. of osmium tetroxide and 5 cc. of dry pyridine was kept at 20° C. for 90 hours. The solvents were then removed under reduced pressure and the residue heated under reflux for 4 hours with a mixture of 7.5 g. of mannitol, 7.5 g. of potassium hydroxide, 75 cc. of ethanol, 30 cc. of benzene and 15 cc. of water. The mixture was then cooled, water was added and the product extracted with ethyl acetate. The organic extract was washed with water, dried over anhydrous sodium sulfate and evaporated to dryness. Crystallization from methanol afforded androstane-2α,3α-diol-17-one.

Example II

A solution of 5 g. of 19-nor-androsterone in 25 cc. of pyridine was cooled to 0° C. Under stirring, there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude tosylate of 19-nor-androsterone.

The total crude compounds was refluxed with 60 cc. of γ-collidine for 90 minutes under anhydrous conditions. The solution was cooled, and filtered. The filtrate was diluted with ether, washed with dilute hydrochloric acid, sodium carbonate solution and water. The dried extract was evaporated and the residue was chromatographed on neutral alumina. Crystallization of the solid fractions from acetone-hexane afforded 19-nor-$\Delta^2$-androsten-17-one.

The foregoing compound was treated following the procedure described in Example I, thus furnishing 19-nor-androstane-2α,3α-diol-17-one.

Example III 1.4 g. of iodine were added portionwise to a stirred mixture of 2.3 g. of silver acetate, 2 g. of $\Delta^2$-androsten-17-one and 350 cc. of acetic acid. When the iodine had been consumed, 0.1 cc. of water was added and the mixture was stirred at 90° C. for 20 hours. There was then added 0.15 g. of sodium chloride in 1 cc. of water to the cooled mixture. The solution was then filtered and the filtrate diluted with water. The product was extracted with methylene chloride, the organic extract washed with dilute sodium carbonate solution, then with water, dried and evaporated to dryness. The residue was left standing overnight in 100 cc. of 5% aqueous sodium hydroxide solution. Water was added, the precipitate filtered off, washed with water to neutral and dried under vacuum. Crystallization from methanol-ethyl acetate furnished androstane-2β,3β-diol-17-one.

When applying the above technique to 19-nor-$\Delta^2$-androsten-17-one, there was obtained 19-nor-androstane-2β,3β-diol-17-one.

Example IV

To 120 cc. of acetone containing 1 g. of androstane-2α,3α-diol-17-one, there were added 30 drops of 78% perchloric acid. After 1 hour at room temperature, 30 drops of pyridine were added and the resulting solution was evaporated to dryness under reduced pressure. 30 cc. of water were added to the residue and it was then extracted several times with 80 cc. of ethyl acetate. The combined extracts were washed to neutrality with water, dried over sodium sulfate and evaporated to dryness. Recrystallizations from the same solvent furnished 2α,3α-isopropylidenedioxy-androstan-17-one.

When applying the foregoing technique to 19-nor-androstane-2α,3α-diol-17-one, androstane-2β,3β-diol-17-one, and 19-nor-androstane-2β,3β-diol-17-one, there were correspondingly obtained 2α,3α-isopropylidenedioxy-19-nor-androstan-17-one, 2β,3β-isopropylidenedioxy-androstan-17-one, and 2β,3β-isopropylidenedioxy-19-nor-androstan-17-one.

Example V

Following the procedure described in Example IV, but substituting acetone by diethyl ketone, there were treated androstane-2α,3α-diol-17-one, 19-nor-androstane-2α,3α-diol-17-one, androstane-2β,3β-diol-17-one, and 19-nor-androstane-2β,3β-diol-17-one, thus furnishing respectively 2α,3α-(diethyl methylenedioxy)-androstan-17-one, 2α,3α-(diethyl methylenedioxy)-19-nor-androstan-17-one, 2β,3β-(diethyl methylenedioxy)-androstan-17-one, and 2β,3β-(diethyl methylenedioxy)-19-nor-androstan-17-one.

Example VI

A solution of 1 g. of sodium borohydride in 3 cc. of water was added to an ice-cooled solution of 1 g. of 2α,3α-isopropylidenedioxy-androstan-17-one, in 120 cc. of methanol and the mixture was allowed to stand for 16 hours at room temperature. The excess reagent was decomposed by addition of acetic acid, the solution was concentrated to small volume in vacuo and diluted with water. The product was extracted with ethyl acetate, the extract was washed with water, dried and evaporated. The solid residue was purified by crystallization from acetone-hexane to give 2α,3α-isopropylidenedioxy-androstan-17β-ol.

When applying the above technique to 2α,3α-isopropylidenedioxy-19-nor-androstan-17-one, 2β,3β-isopropylidenedioxy-androstan-17-one, and 2β,3β-isopropylidenedioxy-19-nor-androstan-17-one, there were correspondingly obtained 2α,3α-isopropylidenedioxy-19-nor-androstan-17β-ol, 2β,3β-isopropylidenedioxy-androstan-17β-ol, and 2β,3β-isopropylidenedioxy-19-nor-androstan-17β-ol.

Example VII

Following the technique described in Example VI, there were treated 2α,3α-(diethyl methylenedioxy)-androstan-17-one, 2α,3α-(diethyl methylenedioxy)-19-nor-androstan-17-one, 2β,3β-(diethyl methylenedioxy)-androstan-17-one, and 2β,3β-(diethyl methylenedioxy)-19-nor-androstan-17-one, thus affording correspondingly 2α,3α-(diethyl methylenedioxy)-androstan-17β-ol, 2α,3α-(diethyl methylenedioxy)-19-nor-androstan-17β-ol, 2β,3β-(diethyl methylenedioxy)-androstan-17β-ol, and 2β,3β-(diethyl methylenedioxy)-19-nor-androstan-17β-ol.

Example VIII

A mixture of 1 g. of 2α,3α-isopropylidenedioxy-androstan-17-one, 2 g. of hydrazine hydrate, 1.2 g. of potassium hydroxide, 1.2 cc. of water and 1.2 cc. of diethylene glycol was heated under reflux for 45 minutes. It was then heated in an open flask until the temperature of the reaction mixture reached 200° C., a reflux condenser was attached, and refluxing was continued for a further 2 hours. The solution was cooled, water was added and the product isolated by extraction with ether. Recrystallization of the residue obtained after evaporation of the solvent from acetone-hexane afforded 2α,3α-isopropylidenedioxy-androstane.

By the same technique, there were treated 2α,3α-isopropylidenedioxy-19-nor-androstan-17-one, 2β,3β-isopropylidenedioxy-androstan-17-one, and 2β,3β-isopropylidenedioxy-19-nor-androstan-17-one, thus furnishing correspondingly 2α,3α-isopropylidenedioxy-19-nor-androstane, 2β,3β-isopropylidenedioxy-androstane and 2β,3β-isopropylidenedioxy-19-nor-androstane.

Example IX

When applying the technique described in the foregoing example to 2α,3α-(diethyl methylenedioxy)-androstan-17-one, 2α,3α-(diethyl methylenedioxy)-19-nor androstan-17-one, 2β,3β-(diethyl methylenedioxy)-androstan-17-one, and 2β,3β-(diethyl methylenedioxy)-19-nor-androstan-17-one, there were respectively obtained 2α,3α-(diethyl methylenedioxy)-androstane, 2α,3α-(diethyl methylenedioxy)-19-nor-androstane, 2β,3β-(diethyl methylenedioxy)-androstane, and 2β,3β-(diethyl methylenedioxy)-19-nor-androstane.

Example X

A solution of 5 g. of 2α,3α-isopropylidenedioxy-androstan-17-one obtained according to Example IV, in 250 cc. of thiophene-free benzene was treated with 27.5 cc. of 4 N methylmagnesium bromide in ether and the mixture was refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 2α,3α-isopropylidenedioxy-17α-methyl-androstan-17β-ol.

Following the above procedure, there were treated the hereinafter listed starting compounds with the indicated Grignard reagent, affording the corresponding products set forth below:

| Starting compound | Grignard reagent | Product |
|---|---|---|
| 2α,3α-isopropylidenedioxy-androstan-17-one. | Vinyl magnesium bromide. | 2α,3α-isopropylidenedioxy-17α-vinyl-androstan-17β-ol. |
| Do | Ethynyl magnesium bromide. | 2α,3α-isopropylidenedioxy-17α-ethynyl-androstan-17β-ol. |
| 2α,3α-isopropylidenedioxy-19-nor-androstan-17-one. | Methyl magnesium bromide. | 2α,3α-isopropylidenedioxy-17α-methyl-19-nor-androstan-17β-ol. |
| Do | Vinyl magnesium bromide. | 2α,3α-isopropylidenedioxy-17α-vinyl-19-nor-androstan-17β-ol. |
| Do | Ethynyl magnesium bromide. | 2α,3α-isopropylidenedioxy-17α-ethynyl-19-nor-androstan-17β-ol. |
| 2β,3β-isopropylidenedioxy-androstan-17-one. | Methyl magnesium bromide. | 2β,3β-isopropylidenedioxy-17α-methyl-androstan-17β-ol. |
| Do | Vinyl magnesium bromide. | 2β,3β-isopropylidenedioxy-17α-vinyl-androstan-17β-ol. |
| Do | Ethynyl magnesium bromide. | 2β,3β-isopropylidenedioxy-17α-ethynyl-androstan-17β-ol. |
| 2β,3β-isopropylidenedioxy-19-nor-androstan-17-one. | Methyl magnesium bromide. | 2β,3β-isopropylidenedioxy-17α-methyl-19-nor-androstan-17β-ol. |
| Do | Vinyl magnesium bromide. | 2β,3β-isopropylidenedioxy-17α-vinyl-19-nor-androstan-17β-ol. |
| Do | Ethynyl magnesium bromide. | 2α,3α-isopropylidenedioxy-17α-ethynyl-19-nor-androstan-17β-ol. |
| 2α,3α-(diethyl methylenedioxy)-androstan-17-one. | Methyl magnesium bromide. | 2α,3α-(diethyl methylenedioxy)-17α-methyl-androstan-17β-ol. |
| Do | Vinyl magnesium bromide. | 2α,3α-(diethyl methylenedioxy)-17α-vinyl-androstan-17β-ol. |
| Do | Ethynyl magnesium bromide. | 2α,3α-(diethyl methylenedioxy)-17α-ethynyl androstan-17β-ol. |
| 2α,3α-(diethyl methylenedioxy)-19-nor-androstan-17-one. | Methyl magnesium bromide. | 2α,3α-(diethyl methylenedioxy)-17α-methyl-19-nor-androstan-17β-ol. |
| Do | Vinyl magnesium bromide. | 2α,3α-(diethyl methylenedioxy)-17α-vinyl-19-nor-androstan-17β-ol. |
| Do | Ethynyl magnesium bromide. | 2α,3α-(diethyl methylenedioxy)-17α-ethynyl 19-nor-androstan-17β-ol. |
| 2β,3β-(diethyl methylenedioxy)-androstan-17-one. | Methyl magnesium bromide. | 2β,3β-(diethyl methylenedioxy)-17α-methyl-androstan-17β-ol. |
| Do | Vinyl magnesium bromide. | 2β,3β-(diethyl methylenedioxy)-17α-vinyl-androstan-17β-ol. |
| Do | Ethynyl magnesium bromide. | 2β,3β-(diethyl methylenedioxy)-17α-ethynyl androstan-17β-ol. |
| 2β,3β-(diethyl methylenedioxy)-19-nor-androstan-17-one. | Methyl magnesium bromide. | 2β,3β-(diethyl methylenedioxy)-17α-methyl-19-nor-androstan-17β-ol. |
| Do | Vinyl magnesium bromide. | 2β,3β-(diethyl methylenedioxy)-17α-vinyl-19-nor-androstan-17β-ol. |
| Do | Ethynyl magnesium bromide. | 2β,3β-(diethyl methylenedioxy)-17α-ethynyl 19-nor-androstan-17β-ol. |

Example XI

A mixture of 1 g. of 2α,3α-isopropylidenedioxy-androstan-17β-ol, 4 cc. of pyridine and 2 cc. of acetic anhydride was kept at room temperature overnight, poured into ice water, the formed precipitate was filtered, washed with water and dried. Crystallization from acetone-hexane gave the acetate of 2α,3α-isopropylidenedioxy-androstan-17β-ol.

By the above technique there were treated the starting compounds listed below, thus furnishing the corresponding products hereinafter disclosed:

| Starting compounds | Products |
| --- | --- |
| 2α, 3α-isopropylidenedioxy-19-nor-androstan-17α-ol | 17-acetate of 2α, 3α-isopropylidenedioxy-19-nor-androstan-17α-ol |
| 2β, 3β-isopropylidenedioxy-androstan-17β-ol | 17-acetate of 2β, 3β-isopropylidenedioxy-androstan-17β-ol |
| 2β, 3β-isopropylidenedioxy-19-nor-androstan-17β-ol | 17-acetate of 2β, 3β-isopropylidenedioxy-19-nor-androstan-17β-ol |
| 2α, 3α-(diethyl methylenedioxy)-androstan-17β-ol | 17-acetate of 2α, 3α-(diethyl methylenedioxy)-androstan-17β-ol |
| 2α, 3α-(diethyl methylenedioxy)-19-nor-androstan-17β-ol | 17-acetate of 2α, 3α-(diethyl methylenedioxy)-19-nor-androstan-17β-ol |
| 2β, 3β-(diethyl methylenedioxy)-androstan-17β-ol | 17-acetate of 2β, 3β-(diethyl methylenedioxy)-androstan-17β-ol |
| 2β, 3β-(diethyl methylenedioxy)-19-nor-androstan-17β-ol | 17-acetate of 2β, 3β-(diethyl methylenedioxy)-19-nor-androstan-17β-ol |

Example XII

Following the procedure described in Example XI, except that acetic anhydride was substituted by propionic anhydride, caproic anhydride, cyclopentylpropionic anhydried, and benzoyl chloride, there were correspondingly obtained the 17-propionates, 17-caproates, 17-cyclopentyl-proprionates and 17-benzoates of the starting compounds mentioned in the same example.

Example XIII

A mixture of 1 g. of 2α,3α-isopropylidenedioxy-17α-methyl-androstan-17β-ol, 1 g. of p-toluenesulfonic acid monohydrate, 50 cc. of acetic acid and 25 cc. of acetic anhydride was kept for 24 hours at room temperature. It was then poured into water and stirred until the excess of anhydride had hydrolyzed. Isolation of the product by methylene chloride extraction and crystallization of the residue from acetone-ether gave the 17-acetate of 2α,3α-isopropylidenedioxy-17α-methyl-androstan-17β-ol.

When applying the above procedure to the starting compounds listed below, there were obtained the products indicated hereinafter:

| Starting compounds | Products |
| --- | --- |
| 2α, 3α-isopropylidenedioxy-17α-vinyl-androstan-17β-ol | 17-acetate of 2α, 3α-isopropylidenedioxy-17α-vinyl-androstan-17β-ol |
| 2α, 3α-isopropylidenedioxy-17α-ethynyl-androstan-17β-ol | 17-acetate of 2α, 3α-isopropylidenedioxy-17α-ethynyl-androstan-17β-ol |
| 2α, 3α-isopropylidenedioxy-17α-methyl-19-nor-androstan-17β-ol | 17-acetate of 2α, 3α-isopropylidenedioxy-17α-methyl-19-nor-androstan-17β-ol |
| 2α, 3α-isopropylidenedioxy-17α-vinyl-19-nor-androstan-17β-ol | 17-acetate of 2α, 3α-isopropylidenedioxy-17α-vinyl-19-nor-androstan-17β-ol |
| 2α, 3α-isopropylidenedioxy-17α-ethynyl-19-nor-androstan-17β-ol | 17-acetate of 2α, 3α-isopropylidenedioxy-17α-ethynyl-19-nor-androstan-17β-ol |
| 2β, 3β-isopropylidenedioxy-17α-methyl-androstan-17β-ol | 17-acetate of 2β, 3β-isopropylidenedioxy-17α-methyl-androstan-17β-ol |
| 2β, 3β-isopropylidenedioxy-17α-vinyl-androstan-17β-ol | 17-acetate of 2β, 3β-isopropylidenedioxy-17α-vinyl-androstan-17β-ol |
| 2β, 3β-isopropylidenedioxy-17α-ethynyl-androstan-17β-ol | 17-acetate of 2β, 3β-isopropylidenedioxy-17α-ethynyl-androstan-17β-ol |
| 2β, 3β-isopropylidenedioxy-17α-methyl-19-nor-androstan-17β-ol | 17-acetate of 2β, 3β-isopropylidenedioxy-17α-methyl-19-nor-androstan-17β-ol |
| 2β, 3β-isopropylidenedioxy-17α-vinyl-19-nor-androstan-17β-ol | 17-acetate of 2β, 3β-isopropylidenedioxy-17α-vinyl-19-nor-androstan-17β-ol |
| 2α, 3α-isopropylidenedioxy-17α-ethynyl-19-nor-androstan-17β-ol | 17-acetate of 2α, 3α-isopropylidenedioxy-17α-ethynyl-19-nor-androstan-17β-ol |
| 2α, 3α-(diethyl methylenedioxy)-17α-methyl-androstan-17β-ol | 17-acetate of 2α, 3α-(diethyl methylenedioxy)-17α-methyl-androstan-17β-ol |
| 2α, 3α-(diethyl methylenedioxy)-17α-vinyl-androstan-17β-ol | 17-acetate of 2α, 3α-(diethyl methylenedioxy)-17α-vinyl-androstan-17β-ol |
| 2α, 3α-(diethyl methylenedioxy)-17α-ethynyl-androstan-17β-ol | 17-acetate of 2α, 3α-(diethyl methylenedioxy)-17α-ethynyl-androstan-17β-ol |
| 2α, 3α-(diethyl methylenedioxy)-17α-methyl-19-nor-androstan-17β-ol | 17-acetate of 2α, 3α-(diethyl methylenedioxy)-17α-methyl-19-nor-androstan-17β-ol |
| 2α, 3α-(diethyl methylenedioxy)-17α-vinyl-19-nor-androstan-17β-ol | 17-acetate of 2α, 3α-(diethyl methylenedioxy)-17α-vinyl-19-nor-androstan-17β-ol |
| 2α, 3α-(diethyl methylenedioxy)-17α-ethynyl-19-nor-androstan-17β-ol | 17-acetate of 2α, 3α-(diethyl methylenedioxy)-17α-ethynyl-19-nor-androstan-17β-ol |
| 2β, 3β-(diethyl methylenedioxy)-17α-methyl-androstan-17β-ol | 17-acetate of 2β, 3β-(diethyl methylenedioxy)-17α-methyl-androstan-17β-ol |
| 2β, 3β-(diethyl methylenedioxy)-17α-vinyl-androstan-17β-ol | 17-acetate of 2β, 3β-(diethyl methylenedioxy)-17α-vinyl-androstan-17β-ol |
| 2β, 3β-(diethyl methylenedioxy)-17α-ethynyl-androstan-17β-ol | 17-acetate of 2β, 3β-(diethyl methylenedioxy)-17α-ethynyl-androstan-17β-ol |
| 2β, 3β-(diethyl methylenedioxy)-17α-methyl-19-nor-androstan-17β-ol | 17-acetate of 2β, 3β-(diethyl methylenedioxy)-17α-methyl-19-nor-androstan-17β-ol |
| 2β, 3β-(diethyl methylenedioxy)-17α-vinyl-19-nor-androstan-17β-ol | 17-acetate of 2β, 3β-(diethyl methylenedioxy)-17α-vinyl-19-nor-androstan-17β-ol |
| 2β, 3β-(diethyl methylenedioxy)-17α-ethynyl-19-nor-androstan-17β-ol | 17-acetate of 2β, 3β-(diethyl methylenedioxy)-17α-ethynyl-19-nor-androstan-17β-ol |

Example XIV

The starting compounds of the preceding example were treated following the procedure described in the same example but substituting acetic anhydride by propionic anhydride, caproic anhydride and cyclopentylpropionic anhydride, thus corresponding affording the 17-propionates, 17-caproates and 17-cyclopentylpropionates of the mentioned starting compounds.

I claim:

1. A compound of the following formula:

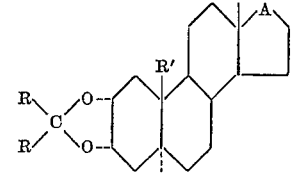

wherein R is a lower alkyl group; $R^1$ is a member of the group consisting of hydrogen and methyl; and A is selected from the group consisting of methylene $$(-CH_2-)$$

carbonyl

and the group

wherein $R^2$ is a member of the group consisting of hydrogen and a hydrocarbon carboxylic acyl group of less than 12 carbon atoms and $R^3$ is selected from the group consisting of hydrogen and an alkyl, alkenyl and alkynyl group of up to 6 carbon atoms.

2. 2α,3α-isopropylidenedioxy-androstan-17-one.

3. 2α,3α - isopropylidenedioxy - 19 - nor - androstan-17-one.

4. 2α,3α - isopropylidenedioxy - androstan - 17β - ol.

5. 2α,3α - isopropylidenedioxy - 19 - nor - androstan-17β-ol.

6. 2α,3α - isopropylidenedioxy - 17α - methyl - androstan-17β-ol.

7. 2α,3α - isopropylidenedioxy - 17α - vinyl - androstan-17β-ol.

8. 2α,3α - isopropylidenedioxy - 17α - ethynyl - androstan-17β-ol.

9. 2α,3α - isopropylidenedioxy - 17α - methyl - 19 -nor- androstan-17β-ol.

10. 2α,3α - isopropylidenedioxy - 17α - vinyl - 19 - nor-androstan-17β-ol.

11. 2α,3α - isopropylidenedioxy - 17α - ethynyl - 19-nor-androstan-17β-ol.

12. A compound of the following formula:

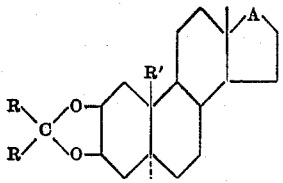

wherein R is a lower alkyl group; R¹ is a member of the group consisting of hydrogen and methyl; and A is selected from the group consisting of methylene (—CH₂—), carbonyl

and the group

wherein R² is a member of the group consisting of hydrogen and a hydrocarbon carboxylic acyl group of less than 12 carbon atoms and R³ is selected from the group consisting of hydrogen and an alkyl, alkenyl, and alkynyl group of up to 6 carbon atoms.

13. 2β,3β - isopropylidenedioxy - androstan - 17 - one.

14. 2β,3β - isopropylidenedioxy - 19 - nor - androstan-17-one.

15. 2β,3β - isopropylidenedioxy - androstan - 17β - ol.

16. 2β,3β - isopropylidenedioxy - 19 - nor -androstan-17β-ol.

17. 2β,3β - isopropylidenedioxy - 17α - methyl - androstan-17β-ol.

18. 2β,3β - isopropylidenedioxy - 17α - vinyl - androstan-17β-ol.

19. 2β,3β - isopropylidenedioxy - 17α - ethynyl - androstan-17β-ol.

20. 2β,3β - isopropylidenedioxy - 17α - methyl - 19-nor-androstan-17β-ol.

21. 2β,3β - isopropylidenedioxy - 17α - vinyl - 19 - nor-androstan-17β-ol.

22. 2β,3β - isopropylidenedioxy - 17α - ethynyl - 19-nor-androstan-17β-ol.

No references cited.